March 3, 1964     E. B. BURNETT     3,123,100

DIRECTIONAL AND FLOW RATE CONTROL VALVE

Filed Oct. 9, 1959     2 Sheets-Sheet 1

INVENTOR
ELMER B. BURNETT
BY
HIS ATTORNEY

March 3, 1964     E. B. BURNETT     3,123,100
DIRECTIONAL AND FLOW RATE CONTROL VALVE
Filed Oct. 9, 1959     2 Sheets-Sheet 2

INVENTOR
ELMER B. BURNETT
BY
HIS ATTORNEY

United States Patent Office 3,123,100
Patented Mar. 3, 1964

3,123,100
DIRECTIONAL AND FLOW RATE
CONTROL VALVE
Elmer B. Burnett, Monroeton, Pa., assignor to Ingersoll-Rand Company, New York, N.Y., a corporation of New Jersey
Filed Oct. 9, 1959, Ser. No. 845,431
2 Claims. (Cl. 137—625.17)

This invention relates to fluid powered rotary tools and more specifically to a valve for changing the direction of rotation and controlling the torque of such tools by limiting the flow of pressure fluid to the motor.

Tools of this type normally have a trigger operated control valve for connecting the pressure fluid to the motor. These valves are of two types the first of which either connects the pressure fluid to the motor or cuts the pressure fluid off. The tools also have a valve for controlling the direction of rotation by alternately connecting either one side or the other of the motor to the pressure fluid. The second type of an actuating valve is where by depressing the trigger only partially a limited amount of fluid is delivered to the motor. With this type of a valve mechanism it is up to the operator's judgment as to the torque output of the tool. This method of controlling the torque by operator judgment is extremely inaccurate, and un-uniform torquing of the fasteners results from use of this type of valve. With the subject invention, the flow to the motor of the tool may be preset and maintained through all of the operations of a similar nature, and then, may be changed when the tool is used on a different operation. The flow is so maintained that the tool may be operated in reverse directions at either the same or different speeds in the different directions.

An object of this invention is to provide a valve for presetting the flow of pressure fluid therethrough and maintaining such preset while varying the flow path.

Another object of this invention is to provide a valve for rotary power tools in which the flow of pressure fluid to the motor may be varied and preset to permit the same or different flow rates in the forward and reverse directions of rotation which may be maintained for repeated operations, and also adapted to change the flow path to change the direction of rotation of the tool.

These and other objects of the invention will become apparent by referring to the following description and the accompanying drawings in which—

Figure 1:
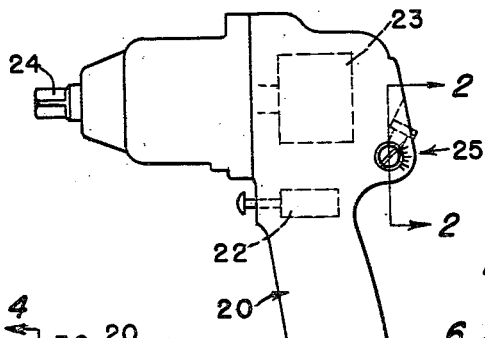
Figure 3:
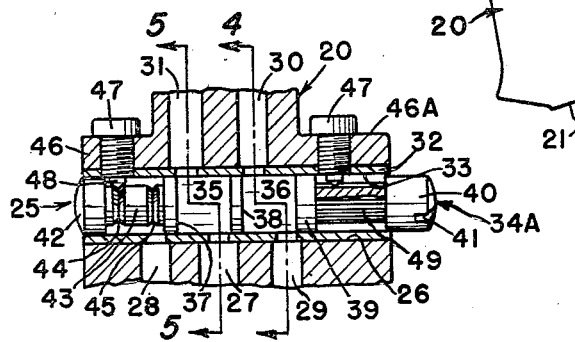
Figure 2:
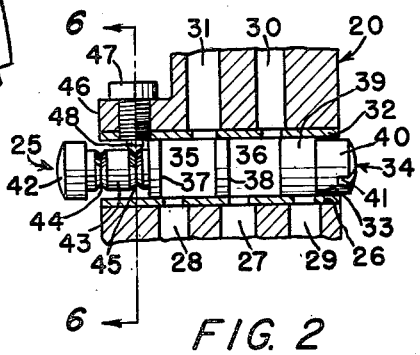
Figure 4:
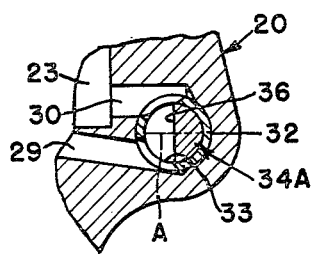
Figure 5:
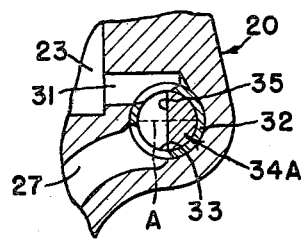
Figure 6:
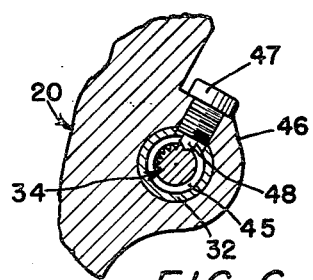
Figure 7:
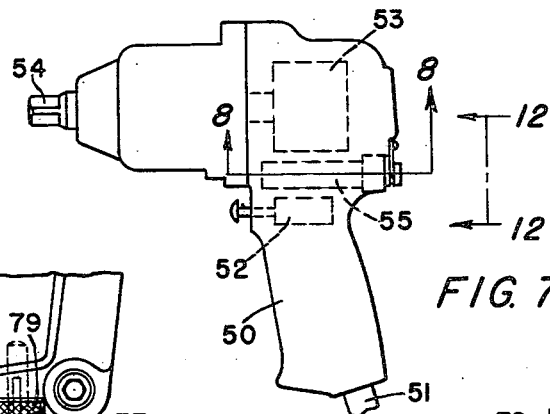
Figure 12:
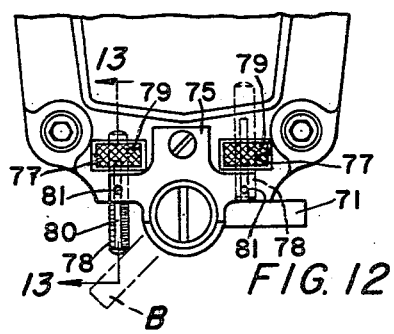
Figure 13:
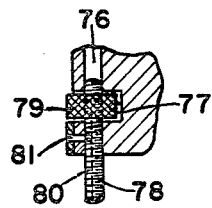
Figure 8:
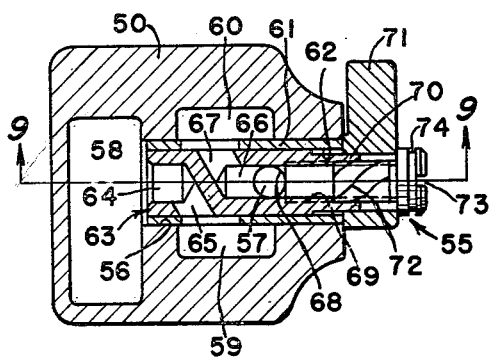
Figure 10:
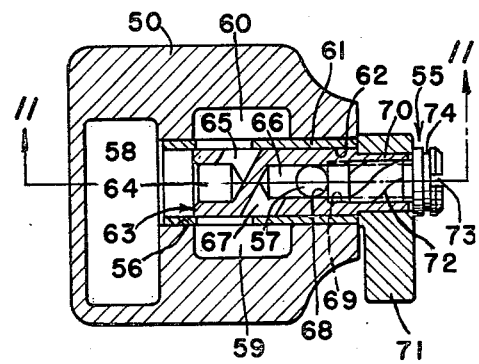
Figure 9:
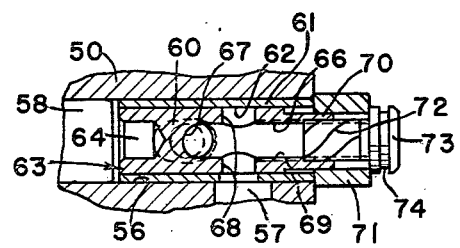
Figure 11:
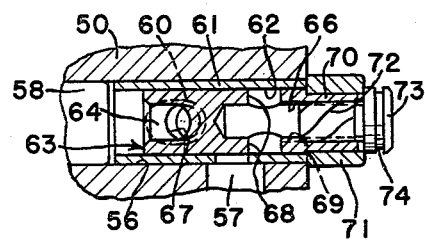

FIGURE 1 is an elevational view of a tool incorporating a valve in accordance with the invention, FIG. 2 is a sectional view of the valve of FIG. 1 with the associated parts and passages rotated into a single plane, FIG. 3 is a view similar to FIG. 2 illustrating a modified valve and casing portion, FIGS. 4 and 5 are sectional views taken along lines 4—4 and 5—5, respectively, of FIG. 3 with the valve and the associated passages in their proper planes, FIG. 6 is a sectional view taken along line 6—6 of FIG. 2, FIG. 7 is an elevational view of a rotary power tool incorporating a modified valve in accordance with the invention, FIG. 8 is a bottom sectional view taken along the line 8—8 of FIG. 7, FIG. 9 is a sectional view taken along the line 9—9 of FIG. 8, FIG. 10 is a view similar to FIG. 8 with the valve rotated 180° from the position of the valve in FIG. 8, FIG. 11 is a sectional view similar to FIG. 9 taken along the line 11—11 of FIG. 10, FIG. 12 is a rear view of a portion of the tool of FIG. 7 looking in the direction of the arrows along plane 12—12, and FIG. 13 is a sectional view taken along the line 13—13 of FIG. 12.

Referring now to the drawings and more specifically to FIGS. 1 to 6, a tool has a casing 20 with a grip portion in which is received a trigger operated cut-off valve 22 for connecting and disconnecting the pressure fluid received through a pressure fluid delivery line 21 to the rotary motor 23 through the direction and quantity control valve 25. The motor 23 rotates a shaft 24, the end thereof being so formed as to receive a driver for engaging a fastener to be rotated.

The tool case 20 has a transverse bore 26 communicating with a fluid pressure delivery line 27 from the valve assembly 22, two exhaust passages 28 and 29, and passages 30 and 31 which extend to either side of the motor 23. Although the bore 26 may be machined to receive a valve 34, more precision may be obtained by inserting a sleeve 32 in the bore 26 as shown. The sleeve 32 has a finished bore 33 adapted to receive the valve 34 movable axially and rotatably therein. The sleeve is maintained in position by a threaded fastener 47 extending through a tapped opening in a shoulder portion 46 and 46A of the case 20 and into a small opening in the sleeve. The sleeve 32 also has a series of ports which are in alignment with the various associated passages and will be considered an integral part of such passages for the purposes of description.

A valve 34 is received in the bore 33 of the sleeve 32 and has a pair of grooves 35 and 36 spaced from one another by a land 38, and in turn spaces the land 38 from lands 37 and 39. Adjacent to the land 39 is a head 40 having a screw driver slot 41 adapted to align with an indicia on the case 20 while the other end of the valve 34 has a push button head 42 spaced from the land 37 by a neck portion 43. The neck portion 43 has a pair of spaced annular grooves 44 and 45 and form seats for a detent 48. The detent 48 is carried by the fastener 47 and is urged into either of the grooves 44 or 45. The valve 34, in the position shown in FIG. 2, connects the inlet passage 27 to the motor 23 via the passage 30 and the groove 36 and connects the other side of the motor to exhaust via the passage 31, the groove 35 and the exhaust passage 28. In this position the detent 48 is seated in the annular groove 45. By depressing the button 42, the valve 34 will move axially in the bore 33 with the detent 48 riding on the neck portion 43 to be reseated in the annular groove 44. When the valve is in this position, the direction of rotation of the motor is reversed and the side formally connected to exhaust is now connected to pressure via the passage 31, the groove 35 and the inlet passage 27 while the other side of the motor 23 formally connected to pressure is now connected to exhaust via the passage 30, the groove 36 and the exhaust passage 29.

A slightly modified form of this valve arrangement 34A is shown in FIG. 3 wherein a second neck portion 49 is disposed between the land 39 and the head 40. The neck portion 43 with the annular grooves 44 and 45 does not have the surface irregularities of the valve 34 to prevent rotation when contacted by the detent member 48. In this arrangement, the case 20 has a second shoulder portion which receives a similar fastener 47 having a similar detent member 48 to engage the irregular surface of the neck portion 49 to prevent rotation of the valve 34A. The valve 34 or 34A is shown in its two operative positions, the first in FIG. 2 and the second in FIG. 3.

Referring now to FIGS. 4 and 5, the valve 34A is in its full open position wherein a maximum flow of pressure fluid from the supply line 21 passes to the motor 23 through the inlet passage 27, the groove 35 and the motor passage 31 while the exhaust fluid leaves the motor 23 via the passage 30, the groove 36 and the exhaust passage 29. It may be seen that by rotating the valve 34A clockwise, the grooves 35 and 36 progressively move out of alignment with the passages 27 and 29, respectively, until the valve has rotated approximately 90° to where the base of the grooves have assumed a position as indicated by the construction line A in which the valve completely closes the inlet passage 27 and the exhaust passage 29. By rotating the valve 34A to an intermediate position between that illustrated in the drawings and the position in which the base of the grooves 35 and 36 lie along the plane A, a restriction between the inlet and exhaust and the motor 23 is provided which limits the fluid flow to and from the motor. The detent members 48 riding in the axial grooves in the neck portions 43 or 49 and the annular grooves 44 and 45 permits the valve 34 or 34A to be shifted axially to reverse the rotation of the motor 23 without changing the quantity controlling position as preset according to the prevailing conditions the tool is to be used for.

Thus we have a valve with a pair of parallel passages adapted to be moved axially between two terminal positions to deliver pressure fluid to one side of a fluid motor and connects the opposite side to exhaust in a first position, and to reversely connect the motor to supply and exhaust in its second terminal position. The valve is also adapted to be rotated between fully opened and closed positions to limit the flow of pressure fluid from the supply when the valve is in either of its two terminal positions relative to axial movement thereof. The passages provided by the valve 34 or 34A are in the form of a surface groove spaced by a land which has a running fit with the bore 33 and a pair of lands 37 and 39 disposed on the outer ends of the grooves to prevent the flow of pressure fluid to the exhaust passages.

A modified valve form in accordance with the invention is illustrated in FIGS. 7 to 13 in which the valve passages are in the form of axial chambers in the valve having various ports communicating with such chambers for connecting the chambers to the various fluid passages. A further difference in the valve is that rotation now controls the directional connection of the motor to the pressure fluid supply thus providing clockwise and counterclockwise rotation of the motor while the axial movement of the valve controls the flow of pressure fluid supply delivered to the motor.

Referring now specifically to FIG. 7, the modified tool has a casing 50 with a grip portion which houses a trigger operated cut-off valve 52 disposed between a pressure fluid supply line 51 and the motor 53. Operation of the cut-off valve 52 supplies the pressure fluid received from the conduit 51 to the motor 53 across a directional and quantitive control valve 55. The rotation of the motor 53 rotates a shaft 54 having an end portion so formed as to receive a driver for engaging fasteners to be driven.

The casing 50 has an axial bore 56 which communicates with an inlet passage 57 from the cut-off valve assembly 52, an exhaust passage 58, and two passages 59 and 60 which go to the motor 53. Although the bore 56 may be machined to receive the valve 63, for better precision, a sleeve 61 having a through-bore 62 is fitted therein and retained against movement. The sleeve 61 has a series of ports therethrough aligned with the various passages communicating with the bore 56 and will be considered part of such passages for description as will the open end of the bore 62 which communicates with the passage 58.

A valve 63 is axially and rotatably received in the bore 62 of the sleeve 61 and has a blind bore 64 extending inwardly from the inner end thereof and a port 65 extending through the wall of the valve 63 in communication with the base of that bore. The valve 63 has a second blind bore 66 extending inwardly from the other end with a port 67 extending through the wall of the valve and in communication with the base thereof. The valve 63 has a pair of diametrically opposed ports 68 through the walls thereof and with the valve in an operating position, one of the ports is in communication with the bore 66. With the valve 63 in its full open position in one of its terminal positions to drive the motor either clockwise or counterclockwise, one of the ports 68 is in full communication with the inlet passage 57. The outer periphery of the valve 63 has a neck portion 70 including at least one flat surface which extends through a lever 71 and having a sliding fit therewith so the valve 63 may move axially relative to the lever 71 but will rotate when the lever is moved. The outer end of the passage 66 is threaded to receive a threaded fastener 72 having a head with a slot 73 and an annular groove 74. The valve 63, the lever 71 and the fastener 72 are prevented from falling out of the tool by a plate 75 mounted on the case 50 and having an edge portion to engage the groove 74. The fastener 72 in addition to moving the valve 63 axially when it is rotated relative to the lever 71 also closes the outer end of the chamber 66 to prevent leakage.

As may be seen in FIGS. 8 and 10, the inlet passage 57 is alternately connected to the motor passages 59 or 60 by rotation of the valve 63 by movement of the lever 71. In FIG. 8, pressure fluid is delivered to the motor 53 via the motor passage 60, the port 67, the axial bore 66 and the port 57. The other side of the motor 53 exhausts via the motor passage 59, port 65, the bore 64 and the exhaust passage 58. Reverse rotation of the motor 53 is obtained by positioning the lever 71 180° opposite to that as shown in FIG. 8 as may be seen in FIG. 10. The motor passage 59 which was formally connected to exhaust in FIG. 8 is now connected to the pressure fluid supply via the port 67, the bore 66 and the port 68 while the motor passage 60 is now connected to the exhaust passage 58 via the port 65 and the bore 64.

To control the quantity of pressure fluid delivered to the motor 53, the fastener 72 is rotated relative to the lever 71 and the valve 63 to move the valve axially between two terminal positions the first as illustrated in FIGS. 8 and 9 wherein the port 68 is fully aligned with the inlet passage 57 to provide maximum flow to the motor, and the second terminal position as illustrated in FIGS. 10 and 11 in which the ports 68 are out of alignment with the inlet passage 57 and no fluid is permitted to pass through the valve 63 to the motor 53. By rotating the fastener 72 the valve 63 is axially positioned relative to the inlet passage 57 to provide a predetermined flow through the valve. This flow is maintained until a new desired flow is provided by again rotating the fastener 72. Reversal of direction of the motor is obtained by turning the lever 71 from one terminal position to another. It can be clearly seen, that rotation of the lever also rotates the valve 63 and the fastener 72. In this manner the same rate of flow through the valve is provided to rotate the motor clockwise and counter-clockwise.

It is desirable under certain conditions to provide a greater flow to the motor when rotating the motor in one direction than in the reverse direction. To this end the valve arrangement has been provided with another limiting means as will be described.

Referring now more specifically to FIGS. 12 and 13, the casing 50 has a pair of drilled holes 76 in the back portion of the head end thereof, one hole disposed on each side of the bore 56. Slots 77 are cut into the back portion of the casing 50 and intersect the holes 76. Thumb wheels 79 are received in the slots 77 and have threaded openings therein to receive threaded members 78 which are received in the holes 76. By rotating the thumb wheel 79 the threaded member 78 is fed into and out of the hole 76. To provide relative rotation between the threaded member 78 and the thumb wheel 79, the member 78 has an axial surface groove 80 which is engaged by a pin 81 extending through the casing 50.

To provide different flows through the valve in its two terminal positions, the fastener 72 is rotated relative to the valve 63 to position the valve axially relative to the inlet passage 57 to obtain the desired maximum flow in the one direction of rotation of the motor. This may be visually indicated by the alignment of the slot 73 in the head of the fastener 72 relative to in indicia applied to the plate 75 as may be seen in FIG. 12. One of the thumb wheels 79 is then rotated to move the associated threaded member 78 progressively outwards from the casing 50 and is so positioned to engage the lever 71 to prevent its rotation to its terminal position. The ports 68 and the inlet passage 57 are circular and are substantially coincident with one another when the valve is in its terminal positions, thereby fully connecting the inlet passage 57 to one of the motor passages 59 and 60. Thus, it can be seen that communication between the ports 68 and the inlet passage 57 can be restricted not only by axial misalignment therebetween but also radial misalignment by rotating the valve relative to the sleeve. Thus, when one of the threaded members 78 extends beyond the casing 50, the lever 71 together with the valve 63 is prevented from reaching a terminal position and there is radial misalignment between one of the ports 68 and the inlet passage 57 and restricts communication therebetween to control the amount of pressure fluid passing through the valve 63 to the motor 53. It is in this manner that a maximum desired flow of pressure fluid to the motor is obtained with the lever 71 in its one terminal position and with the threaded member 78 extending from the casing and engaging that lever prior to its reaching its second terminal position reduces the flow through the valve to the motor for rotation in the opposite direction.

I claim:

1. A valve device for controlling the path and rate of flow of fluid therethrough; comprising a housing having an inlet passage, at least one exhaust passage, two delivery passages, and a bore communicating with such passages; a sleeve disposed in said bore having openings through the wall of said sleeve positioned to provide for communication between said passages and the interior of said sleeve; a valve movable axially in the bore between one set of terminal positions and movable rotationally between a second set of terminal positions; two passages formed through said valve for communicating one delivery passage with the inlet passage by means of one passage and simultaneously communicating the other delivery passage with the exhaust passage by means of the other passage when such valve is in a terminal position of said first set, and communicating the two delivery passages in a reverse manner with the inlet and exhaust passages when such valve is in the other terminal position of said first set; said valve movable between terminal positions of the other set to vary the extent of communication between one of the valve passages and the inlet; said valve having a neck portion including a pair of spaced annular grooves, at least one wall of each groove having a plurality of axial grooves, a threaded fastener received in said housing and extending through the wall of said sleeve to prevent movement of said sleeve relative to said housing, the inner end of said fastener including means adapted to engage said annular grooves to maintain said valve in said terminal positions and simultaneously engage the axial grooves of the associated annular groove to hold said valve against rotation.

2. The device claimed in claim 1 in which said valve has a second neck portion having longitudinal grooves in the surface thereof, and detent means received in said housing for said second neck portion to engage one of the groves of said second neck portion to prevent said valve from rotary movement relative to said sleeve.

References Cited in the file of this patent

UNITED STATES PATENTS

| | | |
|---|---|---|
| 630,588 | Cathcart | Aug. 8, 1899 |
| 1,223,022 | Baird | Apr. 17, 1917 |
| 2,059,364 | Kimball | Nov. 3, 1936 |
| 2,471,289 | Sedgwick | May 24, 1949 |
| 2,547,254 | Braithwaite | Apr. 3, 1951 |
| 2,684,828 | Roberts | July 27, 1954 |
| 2,686,650 | Evans | Aug. 17, 1954 |
| 2,747,611 | Hewitt | May 29, 1956 |
| 2,766,834 | Boyer | Oct. 16, 1956 |
| 2,781,056 | Carufel | Feb. 12, 1957 |
| 2,793,657 | McCullough | May 28, 1957 |
| 3,015,344 | Hausmann | Jan. 2, 1962 |